United States Patent Office 2,870,868
Patented Jan. 27, 1959

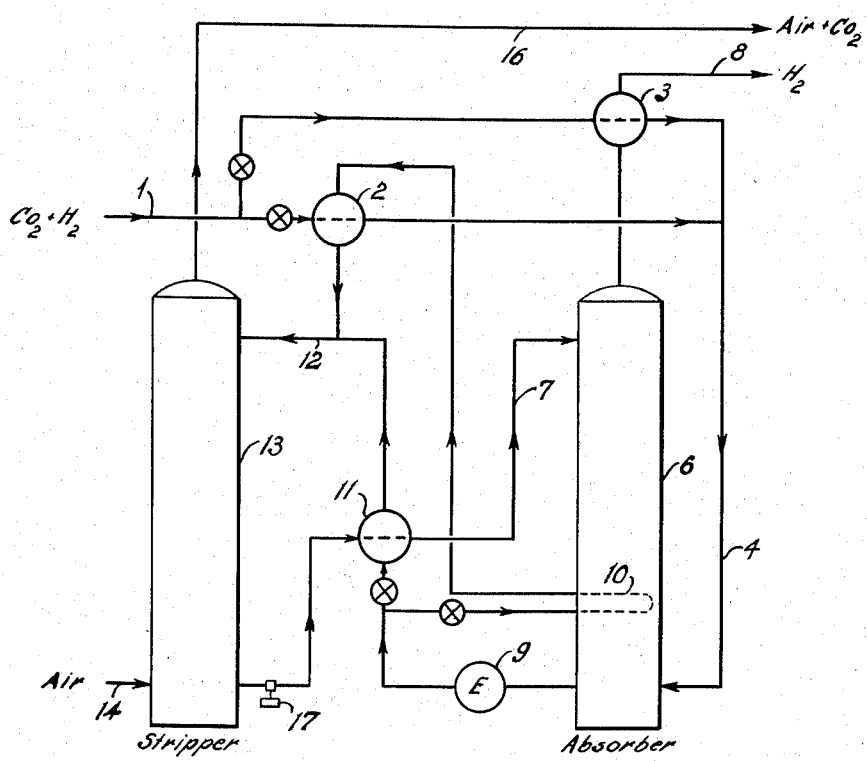

2,870,868

SEPARATION OF CARBON DIOXIDE FROM GASEOUS MIXTURES

Du Bois Eastman, Whittier, and Warren G. Schlinger, Altadena, Calif., assignors to The Texas Company, New York, N. Y., a corporation of Delaware Application June 1, 1956, Serial No. 588,855

5 Claims. (Cl. 183—115)

This invention relates to a process for the separation of carbon dioxide from a gaseous mixture. In one of its more specific aspects it relates to a process for selective absorption of carbon dioxide from a mixture of carbon oxides, hydrogen and gaseous hydrocarbons. The process is applicable to the selective removal of carbon dioxide from hydrogen, carbon monoxide, methane, and similar fixed gases.

The problem of separation of carbon dioxide from a mixture of gases is often encountered in chemical processes. Water and other selective solvents, such as diethanolamine, are commonly used for this purpose. Where large volumes of gas are treated, particularly gaseous mixtures containing a relatively high carbon dioxide content, removal of carbon dioxide by these processes becomes a costly operation.

The process of this invention effects removal of carbon dioxide by absorption in a light distillate hydrocarbon. Preferably a hydrocarbon distillate fraction having a boiling range not above the kerosene boiling range is preferred. Stoddard solvent is a preferred hydrocarbon distillate fraction for use in the present process. An important advantage of the process of this invention results from the fact that it is not necessary to heat the solvent to an elevated temperature to release the absorbed carbon dioxide therefrom.

Recently there has been considerable interest in the production of hydrogen by partial oxidation of a carbonaceous fuel to a mixture of carbon monoxide and hydrogen, reaction of carbon monoxide with steam to produce hydrogen and carbon dioxide, and removal of the carbon dioxide from the gas stream to give a relatively pure stream of hydrogen. For each mol of carbon monoxide reacted with steam, in the water-gas shift reaction a mol of hydrogen is produced together with a mol of carbon dioxide. Removal of the carbon dioxide is necessary to produce a pure hydrogen stream.

Gaseous, liquid, or solid fuels may be converted to carbon monoxide and hydrogen by reaction at elevated temperatures with free oxygen to which may be added either steam or carbon dioxide. Mixtures of carbon monoxide and hydrogen are also produced when light hydrocarbons, particularly normally gaseous hydrocarbons, are reacted with steam. Byproduct gases from the various petroleum refinery operations, for example catalytic reforming, are rich in hydrogen but contain also gaseous or gasiform hydrocarbons. Such refinery gas streams, and similar streams, may be processed for the production of hydrogen by conversion of the hydrocarbon content therein to carbon monoxide and hydrogen by either the steam-hydrocarbon reforming reaction or by partial oxidation with free oxygen. The gaseous mixture obtained from any of these processes comprises chiefly carbon monoxide and hydrogen together with minor amounts of other fixed gases. After conversion of the carbon monoxide to carbon dioxide by the water-gas shift reaction, and removal of carbon dioxide, relatively pure hydrogen may be obtained.

There is also considerable interest at the present time in the production of fuel gas from solid fuels, for example coal and oil shale, and from low grade liquid fuels, such as heavy crude oils or crude residua. These fuels may be converted to carbon monoxide and hydrogen by reaction at elevated temperatures, for example from 2000 to about 3500° F. with oxygen and steam or carbon dioxide. The product gas so obtained is a relatively poor fuel gas since it consists essentially of hydrogen and carbon monoxide both of which have a gross heating value of 340 B. t. u.'s per cubic foot. The heating value of such gases may be increased by synthesis of methane from carbon monoxide and hydrogen in the presence of a suitable catalyst, for example iron oxide, nickel or molybdenum sulfide at a temperature in the range of 1000 to 1800° F. The methanization reaction produces carbon dioxide as a byproduct. Methanization, followed by removal of carbon dioxide, provides a means for improving the heating value of synthesis gas, i. e. a mixture of carbon monoxide and hydrogen, to 500 B. t. u.'s per cubic foot or higher. The present invention takes advantage of the solubility of carbon dioxide in light hydrocarbon to provide a method of effecting removal of carbon dioxide from those gases most commonly associated therewith in various commercial processes. These gases are generally carbon monoxide, hydrogen, nitrogen and gaseous hydrocarbons.

The process of this invention is effective for the removal of carbon dioxide from one or more other gases of lower boiling point than carbon dioxide. It is most generally useful for the separation of carbon dioxide from hydrogen. Carbon dioxide may, if desired, be separated from carbon monoxide by the process of this invention. Generally it is desirable to remove carbon monoxide as well as carbon dioxide. The process of this invention may be used for this purpose.

Often sulfur-containing gases, for example hydrogen sulfide, carbon disulfide, carbonyl sulfide or sulfur dioxide are contained in the gas stream. The process of this invention may be used for the removal of sulfur-containing gases as well as or together with carbon dioxide.

In the process of this invention carbon dioxide is selectively removed from a mixture comprising carbon dioxide and at least one other gas of lower boiling point by contacting the mixture with a light hydrocarbon, preferably a normally liquid light distillate, at superatmospheric pressure and at a temperature below about 80° F. and preferably below about 0° F. but not below about —100° F. and generally not below about —70° F. The lower temperature limits are determined by the point at which solid carbon dioxide or carbon dioxide complexes form in the system or the hydrocarbon becomes excessively viscous. These limiting temperatures vary somewhat with the composition of the system and the pressure at which the operation is carried out. In general, it is desirable to operate at the lower temperatures within practical limits to obtain the benefit of the increased solubility at the low temperatures.

In carrying out the process of this invention, a stream of gas containing carbon dioxide admixed with lower boiling gases is contacted at superatmospheric pressure, for example from about 50 to 1000 pounds per square inch gauge, preferably at a pressure of at least 200 pounds per square inch gauge with a light hydrocarbon, preferably a normally liquid light distillate, at a reduced temperature, preferably below about 40° F. effecting removal of the carbon dioxide from the gas stream and enrichment of the hydrocarbon with absorbed carbon dioxide. The rich absorbent is subjected to expansion to a lower pressure, preferably less than 50 p. s. i. g. and suitably near atmospheric pressure, which results in cooling of the hydrocarbon-carbon dioxide mixture to a lower temperature. The cold hydrocarbon-carbon dioxide mixture is heat exchanged with the lean absorbent and with the incoming gas stream to maintain the desired low temperature in the absorption system. Separation of carbon dioxide from the lean absorbent may be accomplished by blowing the absorbent liquid with a stripping gas at about atmospheric temperature.

By means of the present invention it is possible to carry out the absorption of the carbon dioxide from a gas stream containing 25 percent or more carbon dioxide at a pressure of 200 pounds per square inch or higher without the necessity for external refrigeration and without the need for process steam, or stripping steam. The result is an economy of operation which cannot be duplicated by conventional systems, such as water absorption or selective solvent extraction. The process is of particular value in processing of gas produced at a superatmospheric pressure, for example 200 p. s. i. g. or higher, as is often the case with modern processes for the partial oxidation of hydrocarbons or the gasification of coal with oxygen and steam.

Hydrocarbons which may be used include butane, pentane, isopentane, hexanes, heptanes and light distillate fractions. Light distillate fractions having atmospheric boiling ranges lying within the range of 100 to 500° F. are preferred. Gasoline and light naphthas, e. g., Stoddard solvent, are particularly effective solvents.

The process of this invention will be more readily understood from the following detailed description of a specific example, taken with reference to the accompanying drawing which illustrates diagrammatically one preferred arrangement of processing steps for carrying out the process of this invention.

Referring to the drawing, a raw feed gas stream containing carbon dioxide in admixture with hydrogen, enters through line 1 and is divided into two streams. One stream is passed through heat exchanger 2 and the other, through heat exchanger 3 and the combined streams passed through line 4 into the lower portion of an absorber 6. In each of the heat exchangers, the raw feed gas stream is cooled by indirect heat exchange with a process stream as described later. The absorber is a countercurrent liquid-vapor contacting apparatus with bubble trays, or equivalent means, effective for intimate countercurrent contact between the gas and an absorption liquid.

In absorber 6, the raw feed gas stream is contacted with a light hydrocarbon liquid, for example Stoddard solvent, introduced into the top of the absorber through line 7. The absorber is operated at a pressure above about 100 p. s. i. g. and preferably in the range of 200 to 1000 p. s. i. g. Generally, if the gas generator is operated at elevated pressure, the absorber is operated at substantially the same pressure as that at which the gas is generated. The absorption liquid introduced into the absorber is preferably at a temperature below about 40° F. The absorbent is circulated at a rate sufficient to effect substantially complete removal of the carbon dioxide from the gas stream.

The purified gas stream is passed from the absorber through heat exchanger 3 where it passes in indirect heat exchange with incoming feed, and is discharged from the system through line 8. Generally the purified gas stream is desired at absorber pressure, or higher, for subsequent use. If lower pressure is acceptable, the gas from absorber 6 may be expanded, preferably in an engine, prior to heat exchange with the raw feed gas stream to effect a still lower reduction in temperature of the feed stream.

Rich absorbent, containing absorbed or dissolved carbon dioxide, is withdrawn from the lower part of absorber 6 and passed through an expansion engine 9 in which the pressure is reduced substantially. Expansion of the rich absorbent by pressure reduction through a suitable expansion device 9 effects cooling of the rich absorbent liquid to a temperature well below the temperature existing at the base of the absorber. Part of the expanded rich absorbent is passed through intercooler 10 to cool the absorber at an intermediate point in the absorber and then passed in heat exchange with part of the incoming feed gas stream in heat exchanger 2. The remainder passes through heat exchanger 11 in indirect heat exchange with lean absorbent as described later. The streams of rich absorbent are recombined and introduced through line 12 into the upper part of stripper 13.

The expansion device 9 may take any suitable form, for example that of a valve, orifice or engine. An engine, for example a turbine or Pelton wheel, is preferred particularly for installations in which large volumes of gas are processed. An expansion engine effects a greater reduction in temperature for a given pressure reduction than does a valve or orifice.

In stripper 13, which is operated at a pressure well below the absorber pressure, preferably at atmospheric pressure, absorbed carbon dioxide is removed from the absorbent by stripping with a suitable stripping medium. Air, hydrocarbon gas or nitrogen are suitable stripping media. In this specific example, air as the stripping medium is introduced into the lower portion of the stripper through line 14. The stripped carbon dioxide and the gaseous stripping medium are discharged from the stripper through line 16.

Pump 17 withdraws denuded absorbent from the bottom of stripper 13 and passes the lean absorbent through heat exchanger 11 in heat exchange with the cold, rich absorbent and thence through line 7 into the upper portion of absorber 6.

Obviously, various combinations and arrangements of heat exchange steps may be worked out, depending upon the volumes and temperature of the various streams.

The solubility of carbon dioxide in Stoddard solvent at various pressures and temperatures is indicated in the following table wherein the solubility is expressed in terms of standard cubic feet of carbon dioxide per 1000 gallons of Stoddard solvent.

Table

|  | −60° F. | −40° F. | −20° F. | 0° F. | 20° F. | 40° F. | 60° F. | 80° F. |
|---|---|---|---|---|---|---|---|---|
| 0 p. s. i. g | 994 | 733 | 547 | 422 | 330 | 269 | 222 | 181 |
| 50 p. s. i. g | 4,521 | 3,283 | 2,403 | 1,855 | 1,474 | 1,200 | 978 | 823 |
| 100 p. s. i. g |  | 6,739 | 4,578 | 3,488 | 2,737 | 2,194 | 1,811 | 1,336 |
| 150 p. s. i. g |  |  | 8,697 | 6,268 | 4,810 | 3,751 | 3,106 | 2,380 |
| 200 p. s. i. g |  |  | 11,709 | 8,113 | 6,040 | 4,693 | 3,751 | 2,688 |

Note.—The blanks in the above table represent regions in which no separate gas phase is present in the carbon dioxide-Stoddard solvent system.

The Stoddard solvent on which the data in the above table is given has an A. P. I. gravity of 48° and a molecular weight of 136. The 10 percent, 50 percent, and 90 percent points on the Engler distillation are 322° F., 328° F., and 342° F., respectively.

The following example serves to further illustrate the process of this invention.

84,323 standard cubic feet of a raw feed gas mixture of hydrogen and carbon dioxide, containing 1.2 mols carbon dioxide per mol of hydrogen, is contacted with Stoddard solvent in a 50 tray bubble cap-type absorber operating at 500 p. s. i. a. The raw feed gas is cooled by heat exchange, as indicated in the above detailed description in connection with the figure, to a temperature of −5° F. prior to introduction into the absorber. The gas is contacted in the absorber with Stoddard solvent of the characteristics given above at the rate of 41 gallons of solvent per 1000 standard cubic feet of feed gas.

The hydrogen stream (38,000 standard cubic feet) leaving the absorber contains approximately 0.1 to 0.2 mol percent carbon dioxide. The hydrogen stream leaves the absorber at −33° F. The raw feed gas is split into two streams, as previously described, and approximately 43.5 percent of the feed is passed in heat exchange with the hydrogen stream from the absorber, cooling this portion of the feed from 80° F. to −5° F. while at the same time heating the hydrogen stream to 70° F.

Rich absorbent is drawn from the bottom of the absorber at −5° F., expanded in a Pelton wheel to −39° F., and split into two streams as previously described and illustrated in the accompanying figure. One of the streams of rich absorbent, amounting to approximately 11 percent, is passed through an intercooler in heat exchange with solvent at an intermediate point in the absorber (four plates above the bottom) wherein it is heated to −10° F. and then passed in heat exchange with the remaining portion of the feed, cooling this portion of the feed to −5° F. and raising the temperature of the absorbent and associated carbon dioxide to 75° F. The remainder of the rich absorbent (about 89 percent) is passed in heat exchange with lean absorbent, cooling the lean absorbent from 80° F. to −34° F. and heating this portion of the rich absorbent and the associated carbon dioxide to 75° F. The streams of rich absorbent and carbon dioxide associated therewith are reunited and introduced into the top of a stripper containing 12 bubble cap-type trays and operating at atmospheric pressure. 4550 standard cubic feet of air at atmospheric temperature (nominally 80° F.) are blown into the base of the stripper to effect stripping of the carbon dioxide from the absorbent. The stripped absorbent is cooled and returned from the stripper to the absorber as described above.

In an alternative embodiment, the absorption of carbon dioxide in a light hydrocarbon liquid, as described hereinabove, is combined with the process for separation of carbon dioxide as described in U. S. Patent 2,632,316 of March 24, 1953. A portion of the carbon dioxide contained in the mixture is separated from the gas stream by condensation at a pressure above 50 pounds per square inch gauge as described in said patent and the partially purified gas stream, for example the gas stream leaving accumulator 20 through line 30 of the figure of said patent, is treated in accordance with the process described herein to substantially completely eliminate carbon dioxide from the gas stream. Partial removal of the carbon dioxide by condensation greatly reduces the load on the absorption system.

Obviously, many modifications and variations of the invention, as hereinbefore set forth, may be made without departing from the spirit and scope thereof, and therefore only such limitations should be imposed as are indicated in the appended claims.

We claim:

1. A process for the separation of carbon dioxide from a feed gas stream comprising at least 25 percent carbon dioxide in admixture with hydrogen which comprises contacting said mixture in an absorption zone at a pressure in the range of 200 to 1000 p. s. i. g. and at a temperature below about 40° F. with a normally liquid light hydrocarbon distillate having an atmospheric boiling range within the range of 100 to 500° F. effecting substantially complete absorption of said carbon dioxide in said hydrocarbon distillate, discharging a gas rich in hydrogen and substantially free from carbon dioxide from said absorption zone, withdrawing from said absorption zone said hydrocarbon distillate containing said absorbed carbon dioxide, reducing the pressure of said hydrocarbon distillate containing carbon dioxide to a pressure not above about 50 p. s. i. g. effecting expansion and temperature reduction thereof, passing expanded hydrocarbon distillate and carbon dioxide at reduced temperature in heat exchange with hydrocarbon distillate free from carbon dioxide supplied to said absorption zone thereby reducing the temperature of said carbon dioxide-free hydrocarbon distillate and warming said hydrocarbon distillate and carbon dioxide to a temperature above about 40° F., effecting removal of carbon dioxide from said hydrocarbon distillate at said reduced pressure, and returning said hydrocarbon distillate substantially free from carbon dioxide to said heat exchange step and to said absorption zone.

2. A process according to claim 1 wherein said hydrocarbon is a Stoddard solvent.

3. A process according to claim 1 wherein said feed gas stream passed to said absorption zone is precooled by indirect heat exchange with expanded hydrocarbon distillate-carbon dioxide mixture and with hydrogen-rich gas from said absorption zone.

4. A process according to claim 1 wherein expanded hydrocarbon and carbon dioxide mixture is split into two portions, one of said portions is passed in indirect heat exchange with said lean hydrocarbon distillate and the other is successively passed in indirect heat exchange with partly enriched hydrocarbon distillate at an intermediate point in said absorption zone and subsequently passed in indirect heat exchange with said feed gas stream to said absorption zone.

5. A process for preparing a purified hydrogen gas from a high pressure mixed gas stream consisting essentially of carbon dioxide and hydrogen utilizing as a solvent for the carbon dioxide a hydrocarbon distillate having an atmospheric boiling range within the range of 100 to 500° F. which comprises prechilling the high pressure mixed gas stream by indirect heat exchange with at least one cold stream produced as hereinafter defined, passing the prechilled high pressure gas stream through an absorption zone operated at a pressure above 200 p. s. i. g. in countercurrent flow to said hydrocarbon distillate introduced into said absorption zone at a temperature below 40° F., said hydrocarbon being introduced in sufficient volume relative to the volume of said chilled mixed gas to absorb substantially all of the carbon dioxide from said gas in the absorption zone, removing purified hydrogen gas from said absorption zone, withdrawing resulting enriched hydrocarbon absorption liquid from said absorption zone and expanding said enriched liquid by pressure reduction to produce a chilled hydrocarbon-carbon dioxide mixture at a pressure less than 50 p. s. i. g. and utilizing the latter as said cold stream to prechill said high pressure mixed gas stream while concomitantly warming said hydrocarbon-carbon dioxide mixture, introducing said warmed hydrocarbon-carbon dioxide mixture at reduced pressure less than 50 p. s. i. g. into a stripping zone into countercurrent contact with a stripping gas to substantially completely remove carbon dioxide from said hydrocarbon distillate with the formation of a lean absorption liquid, recompressing said lean absorption liquid to said high absorption pressure and passing the same in indirect heat exchange relationship with expanded chilled hydrocarbon-carbon dioxide mixture resulting from expansion of enriched absorption liquid removed from said absorption zone to thereby chill said lean absorption liquid to a temperature below 40° F., and returning chilled lean absorption liquid to said absorption zone.

References Cited in the file of this patent

UNITED STATES PATENTS

| | | |
|---|---|---|
| 2,596,785 | Nelly et al. | May 13, 1952 |
| 2,614,904 | Royer | Oct. 21, 1952 |
| 2,649,166 | Porter et al. | Aug. 18, 1953 |
| 2,781,862 | Fussman | Feb. 19, 1957 |

FOREIGN PATENTS

| | | |
|---|---|---|
| 152,771 | Australia | Aug. 11, 1953 |
| 164,386 | Australia | July 29, 1955 |